US008266959B2

(12) United States Patent
Lin

(10) Patent No.: US 8,266,959 B2
(45) Date of Patent: Sep. 18, 2012

(54) SYSTEM AND METHOD OF IDENTIFYING THE ORIENTATION OF A TRI-AXIAL ACCELEROMETER

(75) Inventor: Sidney Lin, Bothell, WA (US)

(73) Assignee: Fluke Corporation, Everett, WA (US)

( * ) Notice: Subject to any disclaimer, the term of this patent is extended or adjusted under 35 U.S.C. 154(b) by 647 days.

(21) Appl. No.: 12/324,696

(22) Filed: Nov. 26, 2008

(65) Prior Publication Data

US 2010/0126274 A1    May 27, 2010

(51) Int. Cl.
*G01P 15/18* (2006.01)
(52) U.S. Cl. .......................... 73/493; 73/510; 73/514.01
(58) Field of Classification Search ............. 73/493, 73/510, 514.01
See application file for complete search history.

(56) References Cited

U.S. PATENT DOCUMENTS

| 2,373,959 A | 4/1945 | Horr |
| 4,442,388 A | 4/1984 | Phillips |
| 4,734,860 A | 3/1988 | Egli et al. |
| 5,442,147 A | 8/1995 | Burns et al. |
| 5,819,206 A | 10/1998 | Horton et al. |
| 2007/0240486 A1 | 10/2007 | Moore et al. |
| 2008/0147280 A1 | 6/2008 | Breed |

OTHER PUBLICATIONS

International Application No. PCT/US2009/065918, International Search Report and Written Opinion, 7 pages, Mar. 17, 2010.

*Primary Examiner* — John Chapman, Jr.
(74) *Attorney, Agent, or Firm* — Perkins Coie LLP

(57) ABSTRACT

A system and method for analyzing a device that includes a mass configured for motion. The system includes a tri-axial accelerometer disposed to detect acceleration vectors of the device and to output three channels of acceleration data, and a user interface receiving the three channels of acceleration data. The user interface is configured to correlate the three channels of acceleration data with a reference frame defined by three orthogonal axes intersecting at a vertex, and includes a display and a selector. The display shows sets of options that represent dispositions of the device with respect to gravity, placements of the tri-axial accelerometer with respect to the device, and orientations of the tri-axial accelerometer with respect to the device. The selector selects one device disposition option, one tri-axial accelerometer placement option, and one tri-axial accelerometer orientation option.

17 Claims, 7 Drawing Sheets

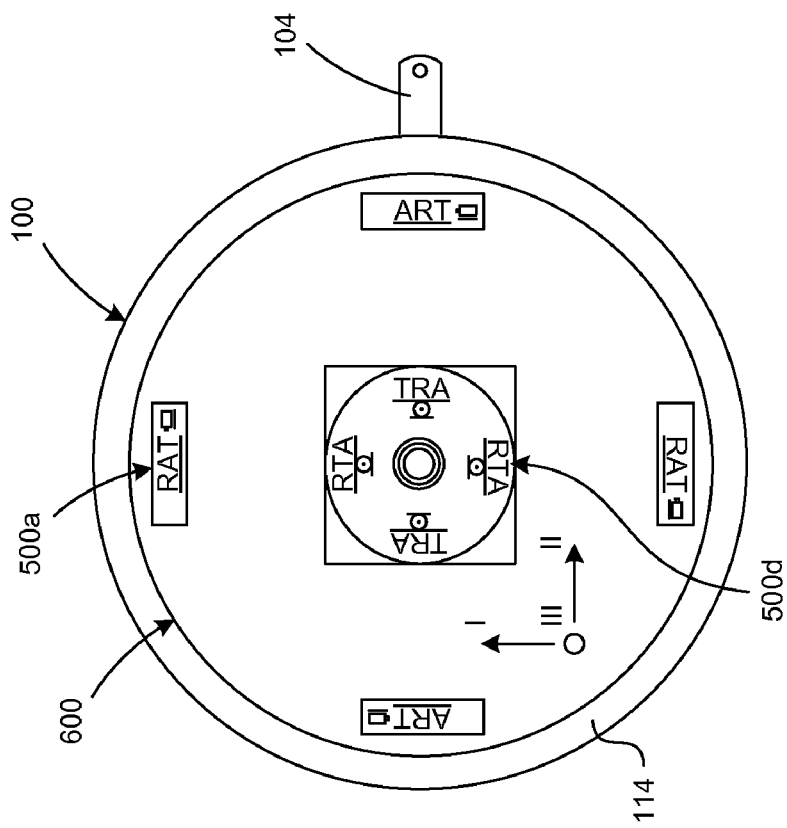
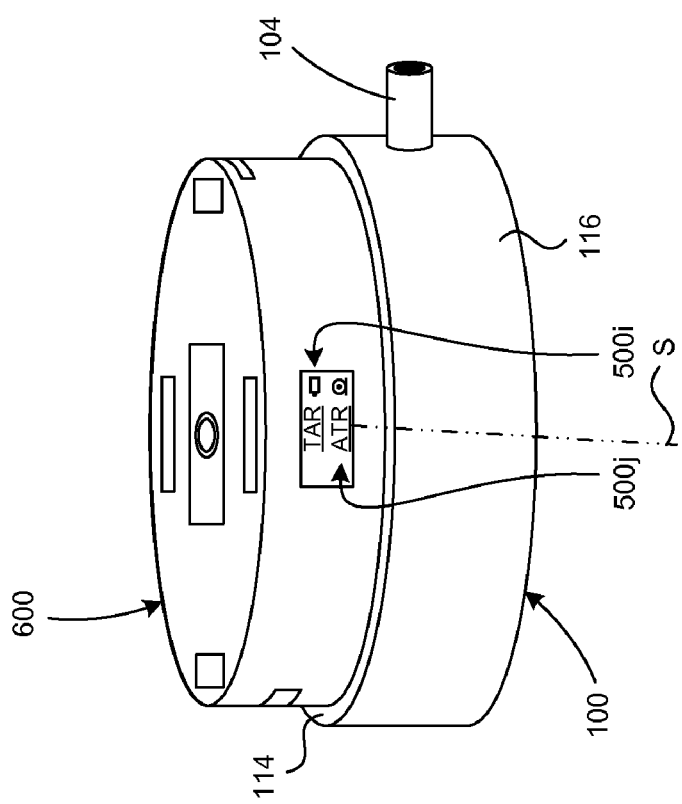
FIG. 6B
FIG. 6A

SYSTEM AND METHOD OF IDENTIFYING THE ORIENTATION OF A TRI-AXIAL ACCELEROMETER

TECHNICAL FIELD

The present disclosure relates to identifying the axial orientation of a multi-axial accelerometer as it is mounted on a device to be analyzed. More particularly, the present disclosure relates to the use of indicia to identify the axial orientation of a multi-axial accelerometer as it is mounted on a device to be analyzed.

BACKGROUND

Acceleration, i.e., the rate of change of velocity, is a vector that is defined by both direction and magnitude. Typically, the magnitude of acceleration is expressed in meters per second per second ($m/s^2$) or popularly in terms of g-force. A conventional single-axis accelerometer measures acceleration that is directed along an axis with which the single-axis accelerometer is aligned. A conventional tri-axial accelerometer measures acceleration in a three-dimensional space using orthogonally oriented sensors to define the direction of acceleration that is detected. Tri-axial accelerometers can detect acceleration and/or gravity induced reaction forces including vibration, imbalance or shock.

The effects of gravity and acceleration are indistinguishable to an accelerometer. As a consequence, the output of a tri-axial accelerometer has an offset due to gravity. This means that a tri-axial accelerometer at rest on the earth's surface will indicate 1 g along a vertical direction. For the tri-axial accelerometer to measure vertical acceleration due to motion alone there must be an adjustment to compensate for the offset due to gravity. At the same time, there is no adjustment for the tri-axial accelerometer to measure horizontal acceleration due to motion.

Accurate measurement of acceleration depends on the identification of the orientation of the tri-axial accelerator relative to gravity and relative to a device on which the tri-axial accelerometer is mounted. Given that a large number of options are available for mounting a tri-axial accelerometer on a device, the potential for inaccurately identifying the orientation of the tri-axial accelerometer is also large.

BRIEF DESCRIPTION OF THE DRAWINGS

FIGS. 6A and 6B are schematic illustration of a tri-axial accelerometer accessory according to an embodiment of the present disclosure.

DETAILED DESCRIPTION

Specific details of embodiments according to the present disclosure are described below with reference to analysis systems and methods for analyzing a device. Devices that can be analyzed according to embodiments of the present disclosure include a mass in motion. The term "motion" can encompass rotation, reciprocation, oscillation, gyration, combinations thereof, or any other continuous, alternating, periodic, and/or intermittent change to the location or arrangement of a mass. The devices can include, for example, electric motors, generators, internal combustion engines, turbines, compressors, pumps, actuators, propellers, wheels, gears, pulleys, shafts, and combinations thereof.

The term "coupled" may encompass various types of relationships between two or more components or features. Further, the phrase "electrically coupled" can encompass a path conductively linking two or more components or features, the phrase "magnetically coupled" can encompass two or more components or features linked by a magnetic field, or the phrase "mechanically coupled" may encompass a physical association or structural linking of two or more components or features. Moreover, several other embodiments of the disclosure can have configurations, components, features or procedures different than those described in this section. A person of ordinary skill in the art, therefore, will accordingly understand that the disclosure may have other embodiments with additional elements, or the disclosure may have other embodiments without several of the elements shown and described below with reference to FIGS. 1-7B.

Figure 1:
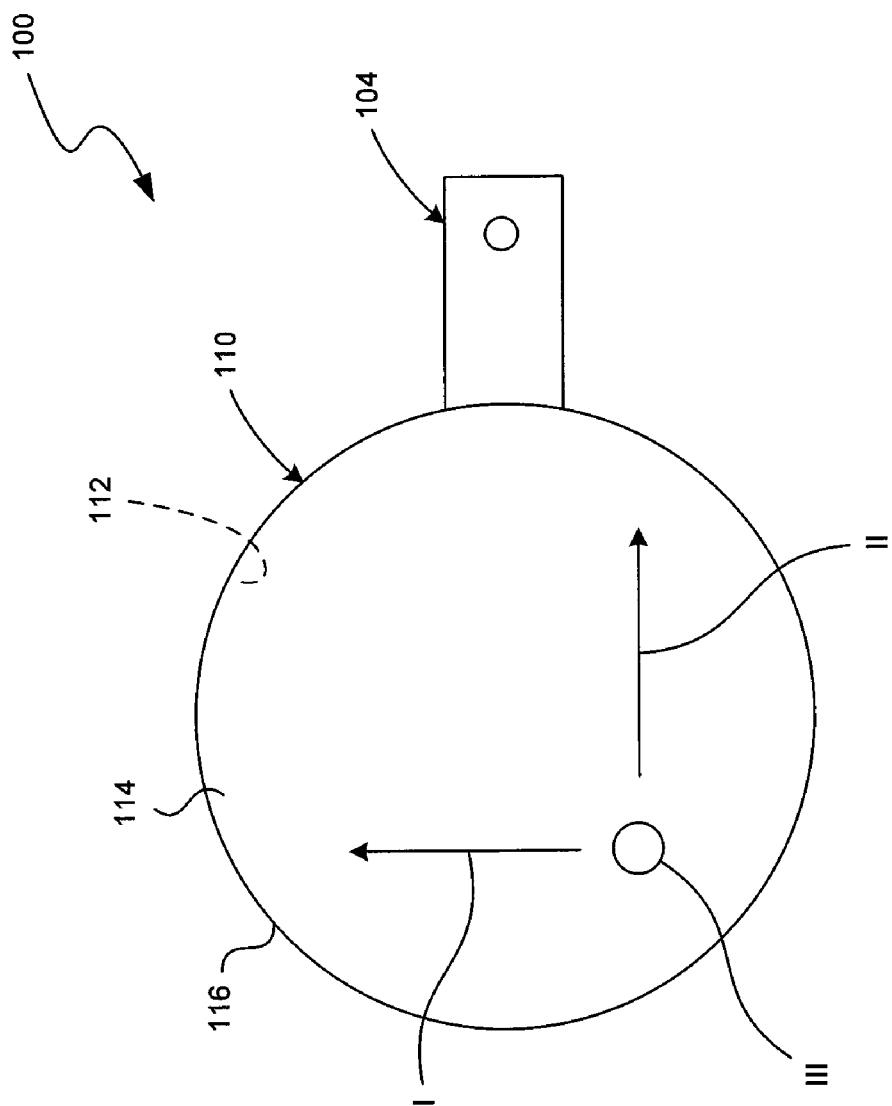
FIG. 1 is a schematic illustration of a tri-axial accelerometer according to an embodiment of the present disclosure.

FIG. 1 is a schematic illustration of a tri-axial accelerometer 100 according to an embodiment of the present disclosure. The tri-axial accelerometer 100 can include an output port 104 disposed on a case 110. The output port 104 can provide a first coupling portion, e.g., an electrical connector, to the tri-axial accelerometer 100. In other embodiments, the output port 104 can include a cable hard-wired to the tri-axial accelerometer 100, a wireless transmitter, a fiber optical connector, or any other device for conveying acceleration data from the tri-axial accelerometer 100. The case 110 can be shaped and sized to facilitate placement on a device to be analyzed. In the embodiment shown in FIG. 1, the case 110 has a round first face 112 configured to facilitate mechanical coupling to the device to be analyzed, a round second face 114 spaced from the first face 112, and a cylindrical lateral surface 116 coupling peripheral edges of the first and second faces 112 and 114. As shown in FIG. 1, the output port 104 can be an electrical connector extending from the lateral surface 116. The tri-axial accelerometer 100 can include three acceleration sensors disposed for detecting acceleration along a first orthogonal axis I, a second orthogonal axis II, and a third orthogonal axis III. In the embodiment shown in FIG. 1, the first face 112 is spaced from the second face 114 along one of the orthogonal axes, e.g., the third orthogonal axis III is shown in FIG. 1, and the second and third orthogonal axes II and III project parallel to the first and second faces 112 and 114. In FIG. 1, the axes I, II and III illustrate an orthogonal, three-axis reference frame of the tri-axial accelerometer 100. According to other embodiments, accelerometers can have more or less than three sensors disposed to detect acceleration along one or more axes. Moreover, the relative angular relationship of multiple axes in other embodiments can be non-orthogonal. According to still other embodiments, the accelerometer case can have any suitable shape including rectangular, cubic, etc.

Figure 2:
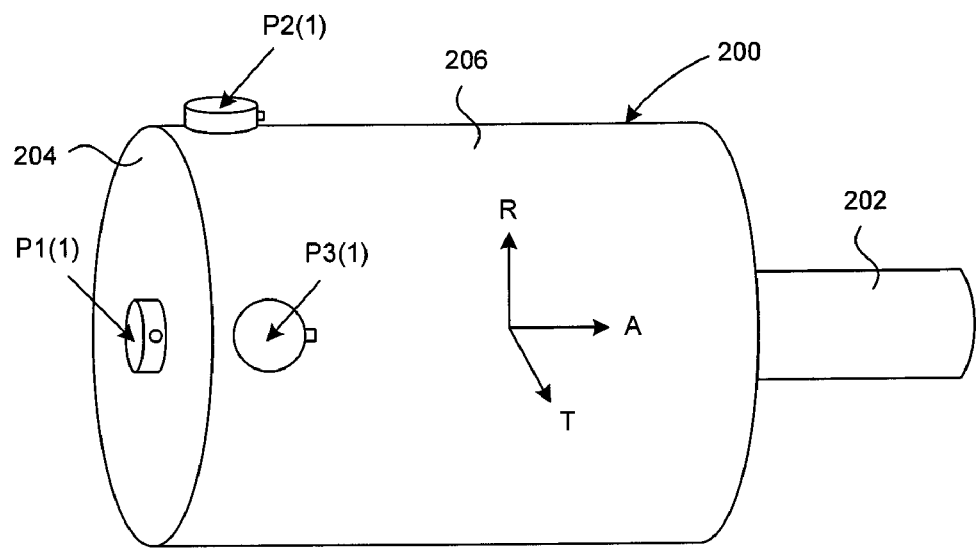
FIG. 2 is a schematic illustration of a device and a first set of three placements of a tri-axial accelerometer according to an embodiment of the present disclosure.

FIG. 2 is a schematic illustration of a first set of three possible placements of the tri-axial accelerometer 100 for detecting axial, radial, and tangential acceleration of a device 200. As shown in FIG. 2, axial acceleration can be detected along an axis A that extends parallel to a rotating shaft 202 of the device 200, radial acceleration can be detected along an axis R that extends radially with respect to the axis A, and tangential acceleration can be detected along an axis T that extends orthogonally with respect to the axes A and R. Thus, as shown in FIG. 2, the tangential axis T is also orthogonal (not tangential) to the axial-flank surface 206. In the embodiment of the present disclosure shown in FIG. 2, the device 200 can be an electric motor, another device that similarly includes a mass rotating on a shaft, or any device that includes a mass in motion.

The device 200 can include an axial-end surface 204 and an axial-flank surface 206. In the embodiment of the present disclosure shown in FIG. 2, the axial-end and axial-flank surfaces 204 and 206 can be portions of a housing, stator, or another portion of the device 200 that is relatively stationary with respect to the rotating shaft 202. As it is used in the present disclosure, the term "flank" can encompass a part or place identified by its location or position with respect to a center. As shown in FIG. 2, axial axis A extends through the axial-end surface 204 and the axial-flank surface 206 surrounds, e.g., circumscribes, axial axis A. According to other embodiments in which the tri-axial accelerometer 100 can be placed on a rotating portion of the device 200, e.g., the shaft 202, a wireless transmitter can be used to output acceleration data from the tri-axial accelerometer 100.

Continuing to refer to FIG. 2, a first placement P1(1) of the tri-axial accelerometer 100 with respect to the device 200 is on the axial-end surface 204. As it is used in the present disclosure, the terms "place" or "placement" refer to a mechanical coupling between the tri-axial accelerometer 100, e.g., the first face 112, and the device 200. Second and third placements P2(1) and P3(1) of the tri-axial accelerometer 100 are on the axial-flank surface 206. The second placement P2(1) is on top of the device 200 and the third placement P3(1) is to the side of the device 200. At the first placement P1(1), the first orthogonal axis I maps to the radial axis R, the second orthogonal axis II maps to the tangential axis T, and the third orthogonal axis III maps to the axial axis A. In the present disclosure, the terms "map," "maps" and "mapping" refer to a spatial relation such that each axis of a given set, e.g., orthogonal axes, is associated with an axis of another set, e.g., directional axes. For the first placement P1(1), the orthogonal axes I-III map to the directional axes RTA, respectively. At the second placement P2(1), the first orthogonal axis I maps to the tangential axis T, the second orthogonal axis II maps to the axial axis A, and the third orthogonal axis III maps to the radial axis R. Therefore, the orthogonal axes I-III map to the directional axes TAR, respectively, for the second placement P2(1). At the third placement P3(1), the first orthogonal axis I maps to the radial axis R, the second orthogonal axis II maps to the axial axis A, and the third orthogonal axis III maps to the tangential axis T. Therefore, the orthogonal axes I-III map to the directional axes RAT, respectively, for the third placement P3(1). According to other embodiments, nomenclature systems other "R," "A" and "T" can be used. Other suitable nomenclature systems can include, for example, "x," "y" and "z" or "1," "2" and "3."

Figure 3:
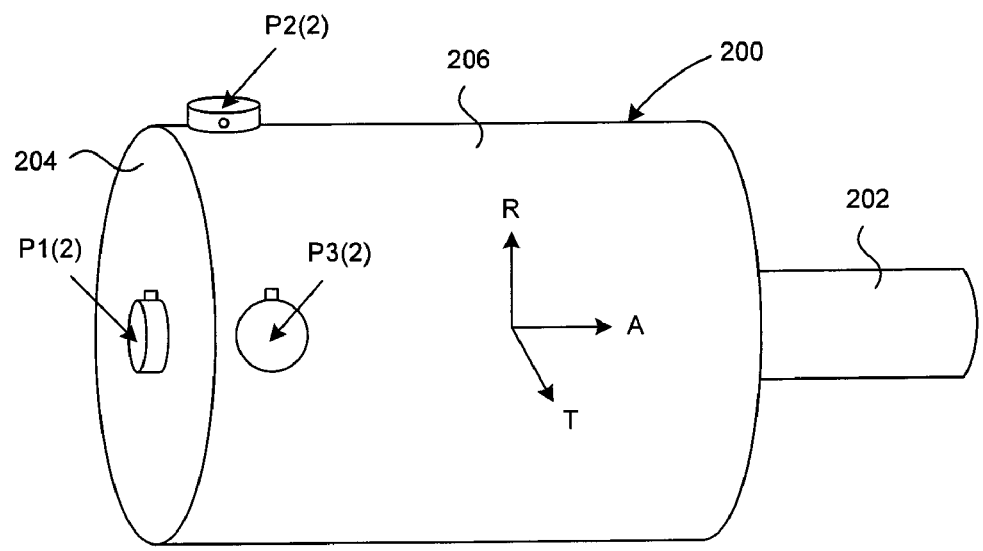
FIG. 3 is a schematic illustration of a device and a second set of three placements of a tri-axial accelerometer according to an embodiment of the present disclosure.

FIG. 3 is a schematic illustration, similar to FIG. 2, of a second set of three possible placements of the tri-axial accelerometer 100 for detecting axial, radial, and tangential acceleration of the device 200. As shown in FIG. 3, however, the orthogonal axes of the tri-axial accelerometer 100 are oriented differently with respect to the directional axes of the device 200, such as would occur when the tri-axial accelerometer 100 is turned before being placed on the device 200. Thus, in the embodiment of the present disclosure shown in FIG. 3, at a first placement P1(2) of the tri-axial accelerometer 100 with respect to the device 200, the first orthogonal axis I maps to the tangential axis T, the second orthogonal axis II maps to the radial axis R, and the third orthogonal axis III maps to the axial axis A. Therefore, the orthogonal axes I-III map to the directional axes TRA, respectively, for the first placement P1 (2). At the second placement P2(2), the first orthogonal axis I maps to the axial axis A, the second orthogonal axis II maps to the tangential axis T, and the third orthogonal axis III maps to the radial axis R. Therefore, the orthogonal axes I-III map to the directional axes ATR, respectively, for the second placement P2(2). At the third placement P3(2), the first orthogonal axis I maps to the axial axis A, the second orthogonal axis II maps to the radial axis R, and the third orthogonal axis III maps to the tangential axis T. Therefore, the orthogonal axes I-III map to the directional axes ART, respectively, for the third placement P3(2).

FIGS. 2 and 3 illustrate that the different placements of the tri-axial accelerometer 100 on the device 200 change how the orthogonal axes map to the directional axes. As such, the number of placement possibilities increases the opportunities to incorrectly identify the axial, radial and tangential accelerations.

Figure 4:
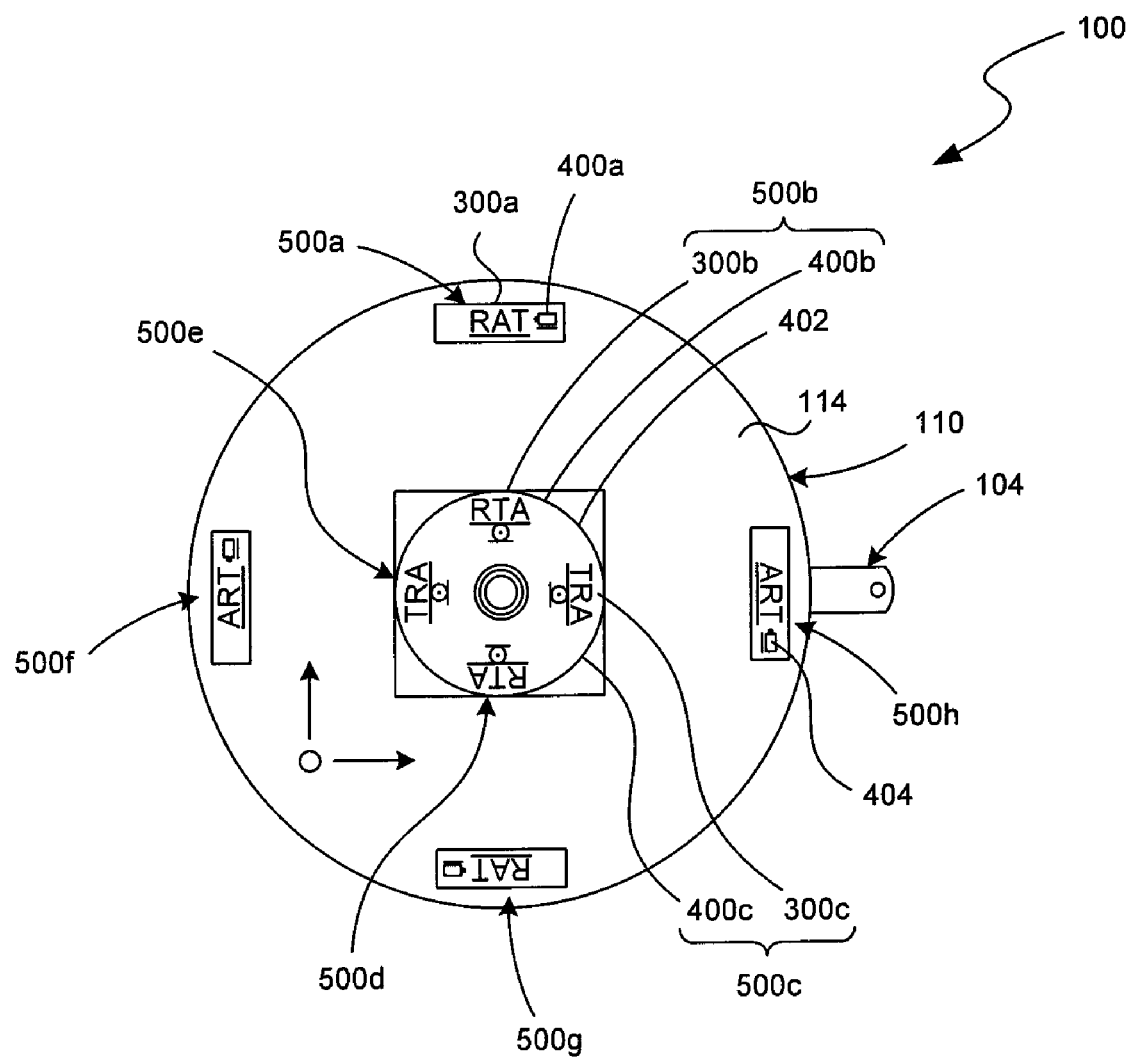
FIG. 4 is a schematic illustration of a tri-axial accelerometer including indicia according to an embodiment of the present disclosure.

FIG. 4 is a schematic illustration of a tri-axial accelerometer 100 including first indicia 300 and second indicia 400 according to an embodiment of the present disclosure. In the present disclosure, the term "indicia" is used as the plural form of "indicium," which can encompass a sign indicating the presence or nature of something.

The first indicia 300 are configured to map orthogonal axes of the tri-axial accelerometer 100 to the directional axes of the device 200. The first indicia 300 uses three identifiers: a first identifier A is associated with the axial axis A of the device 200, a second identifier R is associated with the radial axis R of the device 200, and a third identifier T is associated with the tangential axis T of the device 200. The first indicia 300 includes sequences of the first, second and third identifiers A, R and T, and each sequence is an ordered triplet of the three identifiers, with each of the first, second and third identifiers A, R and T occurring once in each ordered triplet. Thus, according to an embodiment of the present disclosure, there are six possible ordered sequences: ART, ATR, RAT, RTA, TAR and TRA. According to other embodiments of the present disclosure, identifiers can include alternative alphanumeric characters, symbols, colors, or other markings or indications that can be combined in sequences of ordered triplets.

The second indicia 400 are configured to represent placements of the tri-axial accelerometer 100 on the device 200. The second indicia 400 can include first and second schematics 402 and 404. According to the embodiment of the present disclosure shown in FIG. 4, the first schematic 402 represents a placement of the tri-axial accelerometer 100 on the axial-end surface 204 of the device 200, and the second schematic 404 represents a placement of the tri-axial accelerometer 100 on the axial-flank surface 206 of the device 200. Other embodiments can use additional or different schematics, schematics that indicate the direction of gravity, and/or schematics that differentiate between axial-flank surface placements that are on the top or to the side of the device 200.

Continuing to refer to FIG. 4, pairings 500 of a first indicium (i.e., one of the first indicia 300) and a second indicium (i.e., one of the second indicia 400) are disposed at a plurality of locations on the case 110 of the tri-axial accelerometer 100. In the present disclosure, reference numbers 300, 400 and 500 generically refer to the first indicia, second indicia and pairings, respectively, whereas lower case letters a, b, c, . . . are appended to the generic reference numbers to particular identify a first indicium, a second indicium, and a pair, respectively. Thus, a first pair 500a includes a first indicium 300a and a second indicium 400a. According to the embodiment of the present disclosure shown in FIG. 4, the first indicium 300a is the sequence RAT and the second indicium 400a is the second schematic 404 such that the first pair 500a is the combination of RAT and the second schematic 404. Similarly, a second pair 500b is the combination of RTA and the first schematic 402, i.e., the first indicium 300b is the sequence RTA and the second indicium 400b is the first schematic 402. Continuing, a third pair 500c is the combination of TRA and the first schematic 402, i.e., the first indicium 300c is the sequence TRA and the second indicium 400c is the first schematic 402. The first, second and third pairs 500a, 500b and 500c are disposed at locations on the second face 114 of the case 110.

As shown in FIG. 4, the first schematic 402 is shared by the pairs 500c-500e, and the pairs 500a and 500f-500h have individual second schematics 404. In other embodiments, the pairs 500a and 500f-500h can share a single schematic and the pairs 500b-500e can have individual schematics, or a sub-set of the pairs 500a-500h can share single schematics while another sub-set of the pairs 500a-500h can have individual schematics. The first and second schematics 402 and 404 can be grouped as shown in FIG. 4 with the inwardly located pairs 500b-500e including the second schematics 404 and the outwardly located pairs 500a and 500f-500h including the first schematics 402. In other embodiments according to the present disclosure, the locations of pairs disposed along the same diameter of the second face 114 can be interchanged provided that the attitude of the first indiciums are maintained. As it is used in the present disclosure, the term "attitude" can encompass the angular disposition of the first indicium relative to the case 110. Possible attitudes according to the present disclosure can include right-side-up, sideways, and inverted. As shown in FIG. 4, the pairs 500a and 500b are right-side-up, the pairs 500c, 500e, 500f and 500h are sideways, and the pairs 500d and 500g are inverted.

Figure 5A:
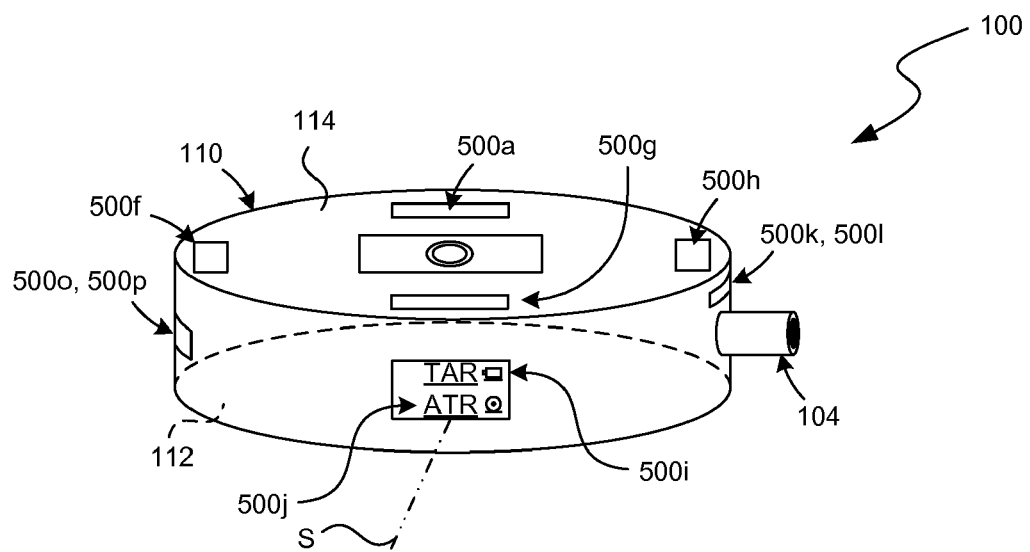
FIGS. 5A-5C illustrate a method of identifying the orientation of a tri-axial accelerometer according to an embodiment of the present disclosure.

With additional reference to FIG. 5A, ninth and tenth pairs 500i and 500j are disposed at a location on the lateral surface 116 of the case 110. The ninth pair 500i is the combination of TAR and the second schematic 404, i.e., the first indicium 300i is the sequence TAR and the second indicium 400i is the second schematic 404. Similarly, the tenth pair 500j is the combination of ATR and the first schematic 402, i.e., the first indicium 300j is the sequence ATR and the second indicium 400j is the first schematic 402. According to the embodiment of the present invention shown in FIGS. 4 and 5A-5C, a total of sixteen pairings 500 are disposed on the case 110. Eight of the pairings 500 are disposed on the second face 114, and eight pairings are disposed on the lateral surface 116. For the sake of clarity, the first through eighth pairs 500a-500h have been described as located on the second face 114 and the ninth through sixteenth pairs 500i-500p (not all of which are particularly indicated in the figures) have been described as located on the lateral surface 116. However, different numbering conventions can be used to designate an order of the locations at which the pairings 500 are disposed on the case 110. According to another embodiment of the present disclosure, first three pairs 500a-500c can be disposed at locations on the second face 114, a fourth pair 500d can be disposed at a location on the lateral surface 116, any five of the remaining twelve pairs 500e-500p can be disposed at locations on the second face 114, and the last seven of the pairs 500e-500p can be disposed at locations on the lateral surface 116.

According to one embodiment of the present disclosure, each pair 500 of the first and second indicium 300 and 400 can be disposed on a label, e.g., a substrate, which can be adhered to the case 110 of the tri-axial accelerometer 100. According to other embodiments of the present disclosure, each pair 500 can be printed or otherwise directly marked on the case 110, or can be engraved or otherwise formed directly on the case 110.

Figure 5B:
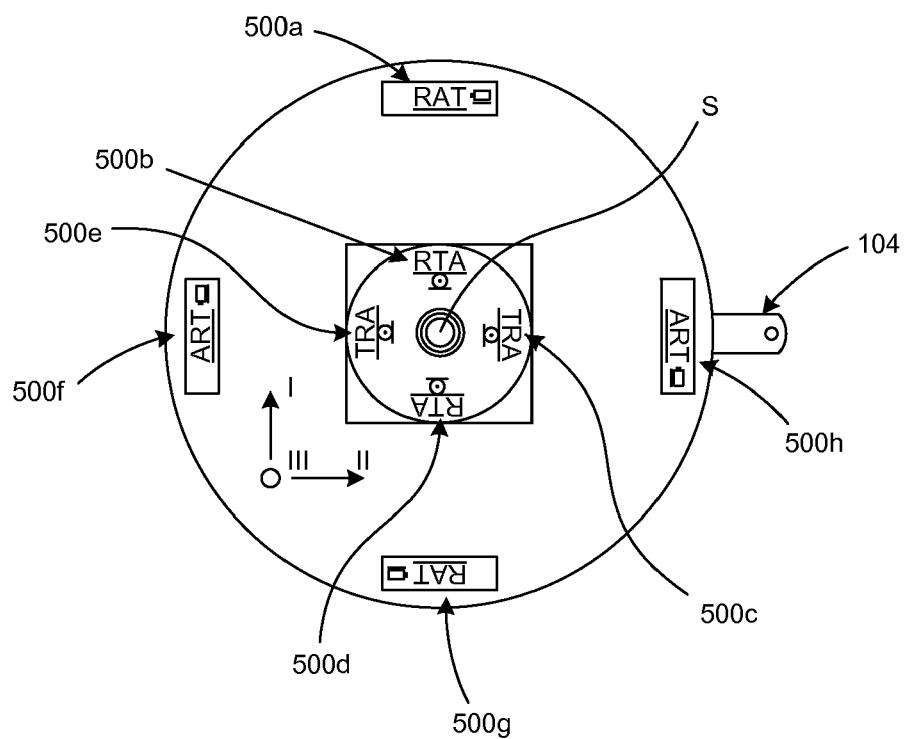
Figure 5C:
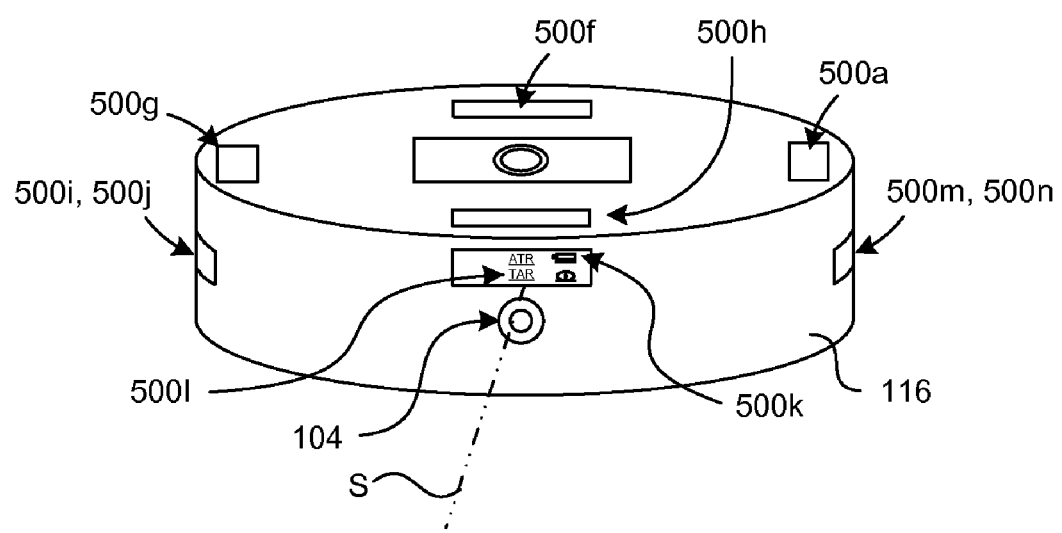

With reference to FIGS. 5A-5C, the following is a description of a method of identifying the orientation of tri-axial accelerometer 100 according to an embodiment of the present disclosure. According to embodiments of the present disclosure, correctly identifying the orientation of the tri-axial accelerometer 100 with respect to the device 200 enables measurement of the acceleration vectors along the axial, radial and tangential axes A, R and T of the device 200. The tri-axial accelerometer 100 is placed on the device 200. The placement of the tri-axial accelerometer 100 can be on the axial-end surface 204 of the device 200 or on the axial-flank surface 206 of the device 200. According to embodiments of the present disclosure in which the rotating shaft 202 of the device 200 extends horizontally, the placement on the axial-flank surface 206 of the device 200 can be either on top of the device 200 or on the side of the device 200. In accordance with embodiments of the present invention, the case 110 of the tri-axial accelerometer 100 includes labels disposed at a plurality of location such as the second face 114 and the lateral surface 116. Each label includes at least one pair 500, e.g., including one of the first indicia 300 and one of the second indicia 400. Thus, the labels include pairings that use the first, second and third identifiers A, R and T to map orthogonal axes of a tri-axial accelerometer with the axial, radial and tangential axes A, R and T of the device 200 (e.g., the first indicia 300) and used schematics that represent placements of the tri-axial accelerometer on the device (e.g., the second indicia 400). According to embodiments of the present disclosure, the axial, radial and tangential axes A, R and T of the device 200 are identified based on a combination of factors that include viewing the tri-axial accelerometer 100 along a line-of-sight S and observing at least one pair 500. The pair 500 that correctly identifies the axial, radial and tangential axes A, R and T of the device 200 includes a first indicium that has an upright attitude and includes a second indicium that matches the placement of the tri-axial accelerometer 100 on the device 200, each as viewed along the line-of-sight S.

FIGS. 6A and 6B are schematic illustration of a tri-axial accelerometer accessory 600 according to an embodiment of the present disclosure. The accessory 600 is marked with the pairs 500a-500p and is secured, either releasably or permanently, to the tri-axial accelerometer 100. Thus, the accessory 600 can be secured to existing tri-axial accelerometers, e.g., those that are not marked with pairings 500. As shown in FIGS. 6A and 6B, the accessory can be secured on the second face 114 of the tri-axial accelerometer 100, and can have a cylindrical configuration. According to other embodiments, there can be different configurations that can be secured differently to other tri-axial accelerometers.

Figure 7B:
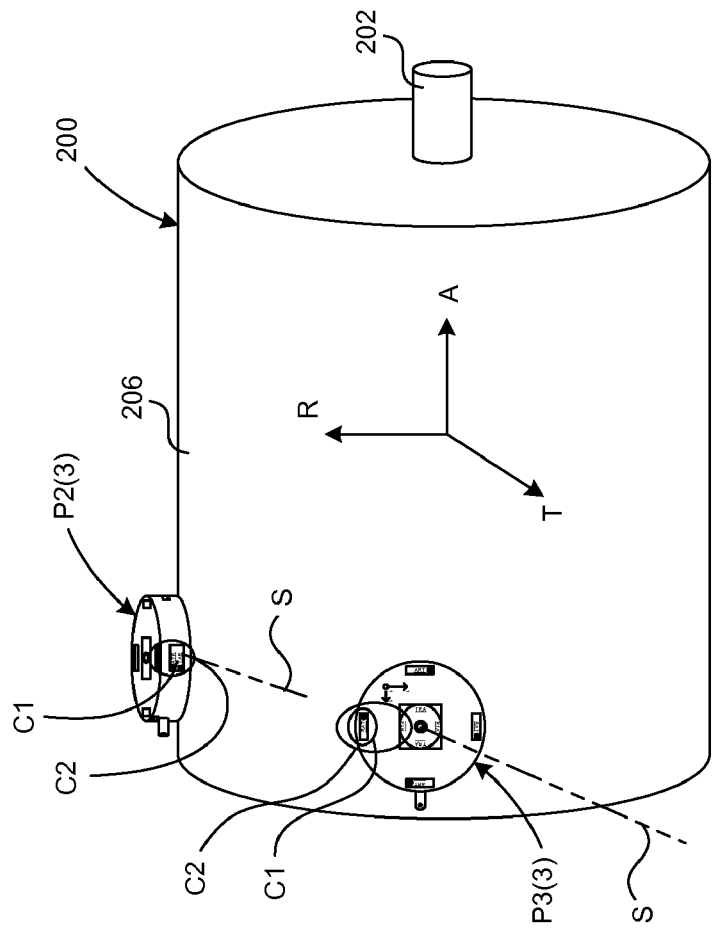
FIGS. 7A and 7B are schematic illustration of device and three placements of a tri-axial accelerometer according to a further embodiment of the present disclosure.
Figure 7A:
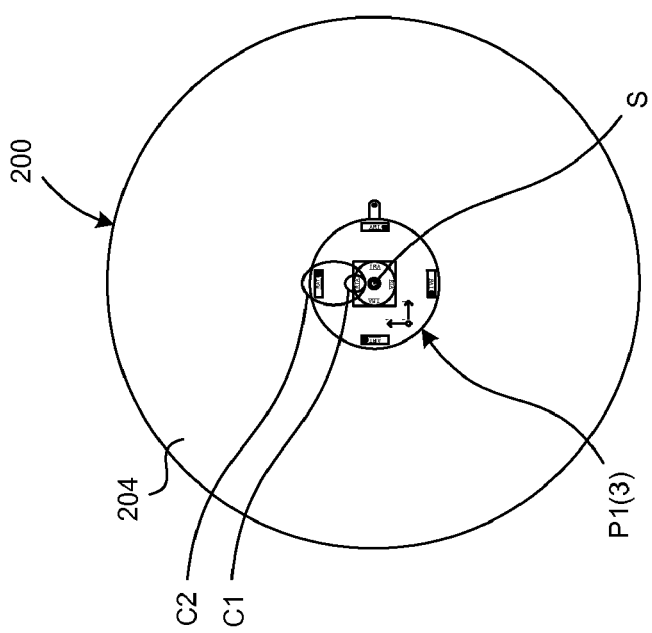

FIGS. 7A and 7B are schematic illustration of device and three placements of a tri-axial accelerometer 100 according to a further embodiment of the present disclosure. FIGS. 7A and 7B are schematic illustrations, similar to FIGS. 2 and 3, of a third set of three possible placements of the tri-axial accelerometer 100 for detecting axial, radial, and tangential acceleration of the device 200. As shown in FIG. 7A, the first placement P1(3) is generally similar to that of first placement P1(1) in FIG. 2. Thus, at the first placement P1(3), the first orthogonal axis I maps to the radial axis R, the second orthogonal axis II maps to the tangential axis T, and the third orthogonal axis III maps to the axial axis A, i.e., the orthogonal axes I-III map to the directional axes RTA, respectively. As shown in FIG. 7B, however, the orthogonal axes of the tri-axial accelerometer 100 are oriented differently with respect to the directional axes of the device 200, such as would occur when the tri-axial accelerometer 100 is turned 180 degrees relative to orientation shown in FIG. 2 before being placed on the device 200. Thus, in the embodiment of the present disclosure shown in FIG. 7B, at the second placement P2(3), the first orthogonal axis I maps to the tangential axis T, the second orthogonal axis II maps to the axial axis A, and the third orthogonal axis III maps to the radial axis R. Therefore, the orthogonal axes I-III map to the directional axes TAR, respectively, for the second placement P2(3). At the third placement P3(3), the first orthogonal axis I maps to the radial axis R, the second orthogonal axis II maps to the axial axis A, and the third orthogonal axis III maps to the tangential axis T. Therefore, the orthogonal axes I-III map to the directional axes RAT, respectively, for the third placement P3(3) of the tri-axial accelerometer 100 with respect to the device 200.

Continuing to refer to FIGS. 7A and 7B, a line-of-sight S for each of the placements P1(3) to P3(3). For each line-of-sight S, two pairings 500 have a first indicium 300 with an upright attitude—these two pairings 500 are indicated in the circled areas C2. Moreover, for each line-of-sight S, one of the two pairings 500 within the circled areas C2 has a second indicium 400 that matches the placement of the tri-axial accelerometer 100 on the device 200—this pairing 500 is indicated in the circled area C1. Accordingly, the first indicium 300 of the pairing 500 in the circled area C1 identifies the orientation of the tri-axial accelerometer 100 with respect to the device 200, and the makes it possible to accurately identify the axial, radial and tangential acceleration vectors measured by the tri-axial accelerometer 100.

Specific details of the embodiments of the present disclosure are set forth in the description and in the figures to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the present disclosure.

Unless the context clearly requires otherwise, throughout the description and the claims, the words "comprise", "comprising", and the like are to be construed in an inclusive sense, as opposed to an exclusive or exhaustive sense; that is to say, in the sense of including, but not limited to. Additionally, the words "herein", "above", "below", and words of similar connotation, when used in the present disclosure, shall refer to the present disclosure as a whole and not to any particular portions of the present disclosure. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

The teachings of the present disclosure provided herein can be applied to systems other than the analysis systems described above. The features of the various embodiments described above can be combined or altered to provide further embodiments.

These and other changes can be made to the invention in light of the above Detailed Description. While the above description describes certain embodiments of the invention, and describes the best mode contemplated, no matter how detailed the above appears in text, the invention can be practiced in many ways. Details of the embodiments in the present disclosure may vary considerably in their implementation details, while still being encompassed by the invention disclosed herein.

The terminology used in the Detailed Description is intended to be interpreted in its broadest reasonable manner, even though it is being used in conjunction with a detailed description of certain specific embodiments according to the present disclosure. Certain terms may even be emphasized; however, any terminology intended to be interpreted in any restricted manner will be overtly and specifically defined as such in this Detailed Description section. In general, the terms used in the following claims should not be construed to limit the invention to the specific embodiments disclosed in the present disclosure, unless the above Detailed Description section explicitly defines such terms. Accordingly, the actual scope of the invention encompasses not only the embodiments disclosed in the present disclosure, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

The invention claimed is:

1. A system for identifying an orientation of a tri-axial accelerometer with respect to a device, the system comprising:
   first indicia configured to map orthogonal axes of the tri-axial accelerometer with directional axes of the device;
   second indicia configured to represent placement of the tri-axial accelerometer on the device; and
   pairings of a first indicium (one of the first indicia) and a second indicium (one of the second indicia) disposed at a plurality of locations on the tri-axial accelerometer.

2. The system of claim 1, wherein the directional axes of the device comprise axial, radial and tangential axes of the device.

3. The system of claim 2, wherein the first indicia comprises three identifiers, a first one of the three identifiers is associated with the axial axis of the device, a second one of the three identifiers is associated with the radial axis of the device, and a third one of the three identifiers is associated with the tangential axis of the device.

4. The system of claim 3, wherein the first indicia comprises sequences of the three identifiers, each sequence comprises an ordered triplet of the three identifiers, and each of the first, second and third identifiers occurs once in each ordered triplet.

5. The system of claim 1, wherein the placements comprise tri-axial accelerometer placement on an axial end surface of the device and tri-axial accelerometer placement on an axial flank surface of the device.

6. The system of claim 5, wherein the second indicia comprises two schematics, a first one of the two schematics represents the tri-axial accelerometer placement on the axial end surface of the device, and a second one of the two schematics represents the tri-axial accelerometer placement on the axial flank surface of the device.

7. A system for identifying axial, radial and tangential axes of a device the system comprising:
   a tri-axial accelerometer detecting acceleration vectors along the axial, radial and tangential axes, the tri-axial accelerometer including—
      first, second and third orthogonal axes;
      a first face configured to be coupled to the device;
      a second face spaced apart from the first face; and
      a lateral surface coupling peripheral edges of the first and second faces;
   first indicia configured to map the first, second and third orthogonal axes with the axial, radial and tangential axes of the device, the first indicia including sequences of a first identifier associated with the axial axis, a second identifier associated with the radial axis, and a third identifier associated with the tangential axis, wherein each of the sequences is an ordered triplet that includes one of each of the first, second and third identifiers;
   second indicia configured to represent placements of the tri-axial accelerometer on the device, the second indicia includes a first schematic that represents a placement of the tri-axial accelerometer on an axial end surface of the device and a second schematic that represents a placement of the tri-axial accelerometer on an axial flank surface of the device;
   a first pairing of one of the first indicia and the first schematic is disposed at a first location on a first one of the second face and the lateral surface;
   a second pairing of one of the first indicia and the second schematic is disposed at a second location on the first one of the second face and the lateral surface;
   a third pairing of one of the first indicia and one of the second indicia is disposed at a third location on the first one of the second face and the lateral surface; and
   a fourth pairing of one of the first indicia and one of the second indicia is disposed at a fourth location on a second one of the second face and the lateral surface lateral surface;
   wherein a line of sight generally coincides with one of the first, second and third orthogonal axes, and one of the first indiciums of the first and second pairings identifies the axial, radial and tangential axes of the device based on (1) the first indiciums of the first and second pairings have an upright attitude as viewed along the line of sight, (2) the first indicium of the third pairing is not visible along the light of sight or has one of a sideways or inverted attitude as viewed along the line of sight, (3) the first indicium of the fourth pairing is not visible along the line of sight, and (4) one of the first and second schematics matches the placement of the tri-axial accelerometer on the device.

8. The system of claim 7, wherein the first and second faces are generally round, and the lateral surface includes a cylinder.

9. The system of claim 7, wherein the tri-axial accelerometer includes a first coupling portion configured to mate with a second coupling portion and to output acceleration data, and the first coupling portion matingly engages the second coupling portion along one of the second and third orthogonal axes.

10. The system of claim 7, wherein a first set of eight pairings, including the first, second and third pairings, are disposed at locations on the first one of the second face and the lateral surface, and a second set of eight pairings, including the fourth pairing, are disposed at locations on the second one of the second face and the lateral surface.

11. The system of claim 7, the first and second indicia are disposed on a substrate.

12. The system of claim 11, wherein the first and second indicia are printed on the substrate, and the substrate is adhered to tri-axial accelerometer.

13. A method of detecting acceleration vectors along the axial, radial and tangential axes of a device the method comprising:
   placing a tri-axial accelerometer on the device, the tri-axial accelerometer comprising
   labeling at locations on the tri-axial accelerometer pairs including one of a first indicia and one of a second indicia, the first indicia configured to map orthogonal axes of a tri-axial accelerometer with the axial, radial and tangential axes of the device, and the second indicia configured to represent placements of the tri-axial accelerometer on the device; and
   identifying the axial, radial and tangential axes of the device, the identifying being based on—
      viewing along a line-of-sight the tri-axial accelerometer; and
      observing one of the pairs including a first indicium having an upright attitude and a second indicium matching placement of the tri-axial accelerometer on the device.

14. The method of claim 13, wherein the first indicia mapping comprises ordering sequences of a first identifier associated with the axial axis, a second identifier associated with the radial axis, and a third identifier associated with the tangential axis, and each of the sequences includes one of each of the first, second and third identifiers.

15. The method of claim 14, wherein the mapping comprises six different ordered sequences.

16. The method of claim 13, wherein the placing comprises one of placing the tri-axial accelerometer on a device axial end surface and placing the tri-axial accelerometer on a device axial flank surface, and the second indicia comprises first and second schematics, the first schematic represents the tri-axial accelerometer placed on the device axial end surface and the second schematic represents the tri-axial accelerometer placed on the device axial flank surface.

17. The method of claim 13, wherein the labeling comprises printing the first and second indicia on a substrate and adhering the substrate to the tri-axial accelerometer.

* * * * *